(12) United States Patent
Brouk et al.

(10) Patent No.: US 8,782,146 B2
(45) Date of Patent: Jul. 15, 2014

(54) METHOD, SYSTEM, AND COMPUTER PROGRAM PRODUCT FOR SENDING AND RECEIVING MESSAGES

(75) Inventors: Lev Brouk, San Francisco, CA (US);
Kenneth Norton, Mill Valley, CA (US);
Jason Douglas, San Francisco, CA (US);
Peter Panee, Santa Monica, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 12/773,779

(22) Filed: May 4, 2010

(65) Prior Publication Data
US 2010/0217820 A1    Aug. 26, 2010

Related U.S. Application Data

(63) Continuation of application No. 09/820,964, filed on Mar. 30, 2001, now Pat. No. 7,788,399.

(60) Provisional application No. 60/278,440, filed on Mar. 26, 2001.

(51) Int. Cl.
*G06F 15/16* (2006.01)

(52) U.S. Cl.
USPC ........... 709/206; 709/204; 709/205; 709/223; 709/224; 709/227

(58) Field of Classification Search
USPC ........... 709/203, 206, 227; 370/223, 352, 392
See application file for complete search history.

(56) References Cited

U.S. PATENT DOCUMENTS

| | | | |
|---|---|---|---|
| 5,983,265 A | 11/1999 | Martino, II | |
| 6,078,959 A * | 6/2000 | Wright et al. | 709/227 |
| 6,336,135 B1 | 1/2002 | Niblett et al. | |
| 6,502,131 B1 | 12/2002 | Vaid et al. | |
| 6,738,975 B1 | 5/2004 | Yee et al. | |
| 6,785,730 B1 | 8/2004 | Taylor | |
| 6,839,771 B1 | 1/2005 | Bouchier et al. | |
| 6,925,483 B1 | 8/2005 | Niemi | |
| 6,957,199 B1 | 10/2005 | Fisher | |
| 7,165,110 B2 | 1/2007 | Neal et al. | |
| 7,327,756 B2 * | 2/2008 | Hamlin | 370/466 |
| 7,383,355 B1 | 6/2008 | Berkman et al. | |
| 7,590,685 B2 * | 9/2009 | Palmeri et al. | 709/203 |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,260,849 B2 | 9/2012 | Shkvarchuk et al. | |

(Continued)

OTHER PUBLICATIONS http://www.oracle.com/technetwork/middleware/ias/oracleenterprisemessagingservicepre-129348.pdf "Oracle Enterprise Messaging Service"—John Lang, Oracle, Apr. 2010.*

(Continued)

*Primary Examiner* — Randy Scott
(74) *Attorney, Agent, or Firm* — Zilka-Kotab, PC

(57) ABSTRACT

A system and method for enabling the interchange of enterprise data through an open platform is disclosed. This open platform can be based on a standardized interface that enables parties to easily connect to and use the network. Services operating as senders, recipients, and in-transit parties can therefore leverage a framework that overlays a public network.

31 Claims, 6 Drawing Sheets

(56) References Cited

U.S. PATENT DOCUMENTS

| | | | |
|---|---|---|---|
| 8,275,836 | B2 | 9/2012 | Beaven et al. |
| 8,595,293 | B2 | 11/2013 | Brouk et al. |
| 2001/0049730 | A1 | 12/2001 | Brendes et al. |
| 2002/0019797 | A1* | 2/2002 | Stewart et al. ............. 705/37 |
| 2002/0026513 | A1 | 2/2002 | Hoglund et al. |
| 2002/0064149 | A1 | 5/2002 | Elliott et al. |
| 2002/0067726 | A1 | 6/2002 | Ganesh et al. |
| 2002/0138553 | A1* | 9/2002 | Binder ..................... 709/203 |
| 2002/0161688 | A1* | 10/2002 | Stewart et al. ............. 705/37 |
| 2003/0014477 | A1 | 1/2003 | Oppenheimer et al. |
| 2003/0105887 | A1 | 6/2003 | Cox et al. |
| 2003/0182383 | A1 | 9/2003 | He |
| 2003/0200184 | A1 | 10/2003 | Dominguez et al. |
| 2005/0021850 | A1 | 1/2005 | Minyard |
| 2005/0195955 | A1* | 9/2005 | Amano et al. ........... 379/202.01 |
| 2005/0246278 | A1 | 11/2005 | Gerber et al. |
| 2005/0256802 | A1* | 11/2005 | Ammermann et al. ......... 705/44 |
| 2005/0267882 | A1 | 12/2005 | Aupperlee et al. |
| 2006/0006224 | A1 | 1/2006 | Modi |
| 2006/0064380 | A1 | 3/2006 | Zukerman |
| 2006/0179058 | A1 | 8/2006 | Bram et al. |
| 2007/0022155 | A1 | 1/2007 | Owens et al. |
| 2008/0016242 | A1 | 1/2008 | Panec et al. |
| 2009/0019534 | A1 | 1/2009 | Bakshi et al. |
| 2009/0106371 | A1* | 4/2009 | Schmidt-Karaca et al. .. 709/206 |
| 2010/0013625 | A1 | 1/2010 | Kouzan et al. |
| 2010/0218245 | A1 | 8/2010 | Brouk et al. |
| 2011/0125854 | A1 | 5/2011 | Macken |
| 2011/0302414 | A1 | 12/2011 | Logan et al. |
| 2012/0158834 | A1 | 6/2012 | Brouk et al. |
| 2012/0158835 | A1 | 6/2012 | Brouk et al. |
| 2012/0324125 | A1 | 12/2012 | Brouk et al. |

OTHER PUBLICATIONS

Non-Final Office Action from U.S. Appl. No. 12/773,776, dated Mar. 11, 2013.
Final Office Action from U.S. Appl. No. 13/409,044, dated Mar. 20, 2013.
Non-Final Office Action from U.S. Appl. No. 12/773,776, dated Jul. 5, 2012.
Advisory Action from U.S. Appl. No. 12/773,776, dated Sep. 17, 2012.
Non-Final Office Action from U.S. Appl. No. 13/409,044, dated Jun. 22, 2012.
Non-Final Office Action from U.S. Appl. No. 13/409,047, dated Jul. 13, 2012.
Non-Final Office Action from U.S. Appl. No. 12/773,776, dated Dec. 8, 2011.
Final Office Action from U.S. Appl. No. 12/773,776, dated Jul. 5, 2012.
Final Office Action from U.S. Appl. No. 13/409,047, dated Jul. 12, 2013.
Non-Final Office Action from U.S. Appl. No. 13/409,044, dated Sep. 4, 2013.
Notice of Allowance from U.S. Appl. No. 13/409,047, dated Sep. 27, 2013.
Non-Final Office Action from U.S. Appl. No. 12/773,776, dated Jul. 5, 2013.
Final Office Action from U.S. Appl. No. 12/773,776, dated Jan. 31, 2014.
Notice of Allowance from U.S. Appl. No. 13/409,044, dated Jan. 14, 2014.

* cited by examiner

METHOD, SYSTEM, AND COMPUTER PROGRAM PRODUCT FOR SENDING AND RECEIVING MESSAGES

This application is a continuation of U.S. application Ser. No. 09/820,964 filed Mar. 30, 2001 now U.S. Pat. No. 7,788,399, which in turn, claims the benefit of U.S. Provisional Application No. 60/278,440, entitled, "System and Method for Routing Messages Between Applications," filed Mar. 26, 2001, which is incorporated herein by reference in its entirety.

BACKGROUND OF THE INVENTION

1. Field of the Invention

The present invention relates to a system and method for message routing. More specifically, the present invention relates to a message routing network for routing messages between applications.

2. Description of the Related Art

Corporate reliance on technology has become more complex and more pervasive. Increasingly, companies are identifying opportunities to extend their core business or cut costs using the Internet. Both trends have put increasing priority on integrating disparate business applications. For this reason, enterprise application integration (EAI) has emerged as a solution for allowing information technology departments to build bridges that are designed to unify their legacy systems into a single enterprise application. Ideally, the creation of this single enterprise application would not require sweeping changes to the underlying structures.

EAI suppliers can be viewed in four categories, by decreasing level of application independence: business process level integrators, process flow automation, data integration tools and data transport. Business process EAI offers a number of advantages over traditional middleware solutions for integrating enterprises. First, business process EAI is alleged to be application independent, allowing it to be used in any heterogeneous environment with a greater degree of reuse. Second, at its higher level of abstraction, business process EAI does not require users and implementers to have a detailed knowledge of each of the underlying technologies.

As many EAI vendors have experienced, the practice of releasing customized connectors (or adapters) for each specific enterprise software package has not proven to be scalable. Scores of adapters need to be built for each vendor (e.g., Oracle, SAP and Peoplesoft). As each supplier releases new versions of their software, EAI vendors find themselves unable to gain traction under the burden of supporting their existing adapters.

Notwithstanding the benefits of EAI, the software costs and resource investments of EAI prevent small-to-medium enterprise (SME) customers from embracing EAI solutions. For SMEs, reliance on application service providers (ASPs) represents an increasingly attractive alternative.

The ASP market is one of the fastest growing segments of the software industry. ASPs make enterprise applications (e.g., human resources administration, recruiting, travel and expense management, sales force automation) available to customers on a subscription basis. Those applications are fully managed and hosted by the ASP, providing significant cost savings to enterprises.

Some ASPs merely host and manage third-party packaged software for their customers ("managed hosters"). Others build new applications from the ground up to take advantage of the benefits and cost-savings of the Web ("webware providers"). Webware providers enjoy the profit margins and operational scalability of consumer Web companies like eBay and Yahoo, while at the same time offering the feature sets of complex enterprise software applications such as Peoplesoft and Siebel.

SUMMARY OF THE INVENTION

In accordance with the present invention, the interchange of enterprise data is supported through an open platform. This open platform can be based on a standardized interface that enables services to easily connect to and use the message interchange network. Services operating as senders, recipients, and in-transit parties can therefore leverage a framework that overlays a public network.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION

An embodiment of the invention is discussed in detail below. While specific implementations are discussed, it should be understood that this is done for illustration purposes only. A person skilled in the relevant art will recognize that other components and configurations may be used without departing from the spirit and scope of the invention.

In accordance with the present invention, the interchange of enterprise data is supported through an open platform for enterprise application integration (EAI). This open platform overlays a public network (e.g., the Internet) and does not require business entities to heavily invest in specialized software and resources. As will be described in greater detail below, the present invention enables the provision of extra-enterprise application integration as a service. This service facilitates EAI efficiently and affordably to the businesses that need it the most (i.e., the small- and medium-sized enterprise (SME) market). More generally, the open platform of the present invention can be used to support services provided by business-to-business (B2B) enablers, system integrators, and other node enablers.

Figure 1:
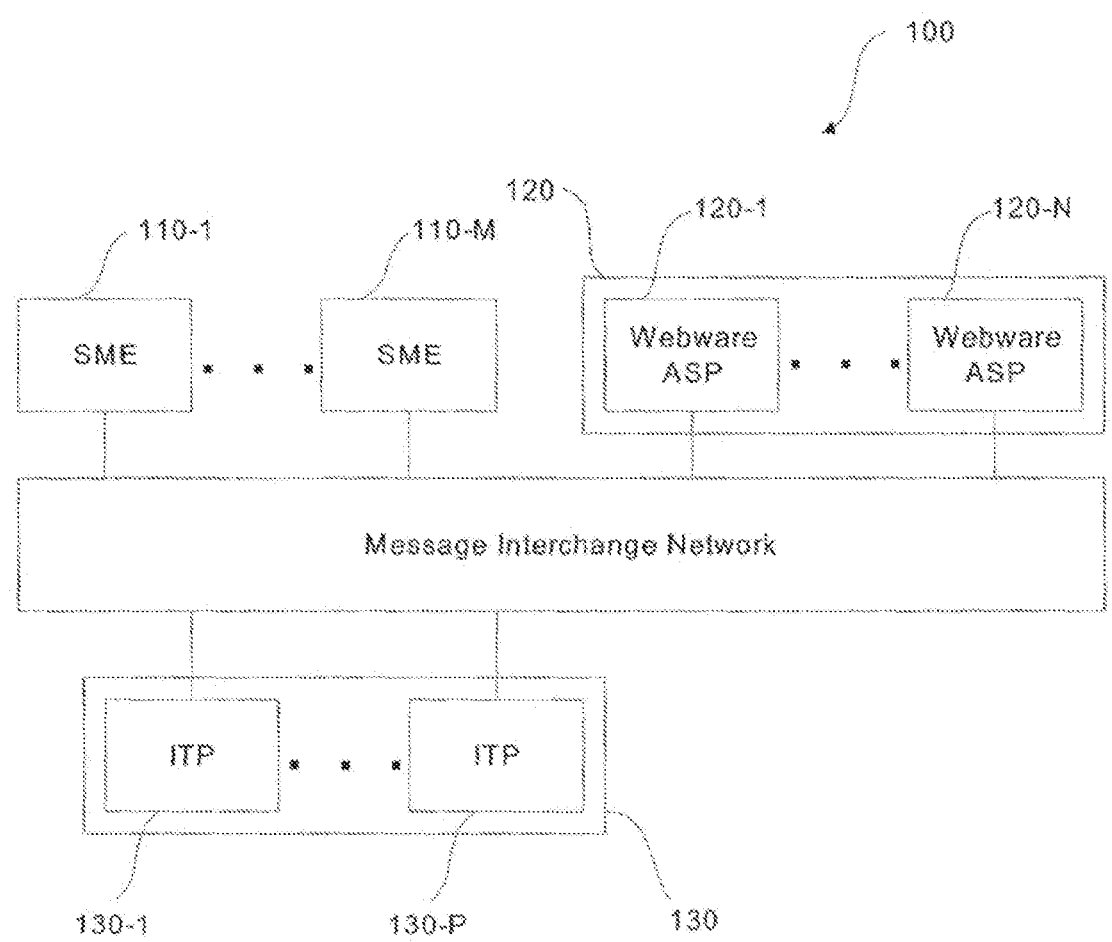
FIG. 1 illustrates a message exchange network.

FIG. 1 illustrates a high-level overview of a message interchange system 100 according to the present invention. Message interchange system 100 includes a message interchange network 150 that enables SMEs 110-*m*, webware ASPs 120-*n*, and in-transit processors (ITPs) 130-*p* to connect to one another, integrate business processes and applications, and exchange data for mission-critical business functions. In general, ITPs 130-*p* are operative to process messages that are in-transit from a sender to a recipient. ITPs 130-*p* can be designed to perform a variety of functions such as data transformation, enrichment, cross-reference ID mapping, filtering, credit scoring, or the like.

A directory (not shown) includes a list of all SMEs 110-*m*, webware ASPs 120-*n* and ITPs 130-*p* that can be accessed via message interchange network 150. Only publicly available services (i.e., those services that organizations register as accessible by any user of the network) are viewable in the directory.

In general, all applications that are connected to message interchange network 150 can be referred to as a service. In the illustrated embodiment of FIG. 1, applications owned by SMEs 110-*m*, webware ASPs 120-*n* and ITPs 130-*p* can each be referred to as services. Each service is owned by an organization, and an organization can have any number of services connected to message interchange network 150. The message exchange within message interchange network 150 is therefore between services.

In one embodiment, services that receive messages can take a set of arguments that further define the intended action the service will perform on a received message. For example, a service may receive the name of an operation, or may permit configuration parameters. In this environment, the service would provide a means (e.g., through a URL to documentation) for message composers to know about arguments accepted by the particular service. The message composer can then include selected arguments as a part of the service declaration in a message.

As described, services registered with message interchange network 150 represent applications that send or receive messages. An organization may, however, wish to create virtual services which act as proxies to other services. For example, a business X may have a relationship with business Y such that messages sent to business X's service are redirected to business Y's service. Services can implement redirection through routing scripts that map invocations of the service to invocations of another service, including redirection of replies.

For each service registered by an organization with message interchange network 150, there are a number of properties and permissions that can be associated with the service. Examples include a unique service identifier, authentication information, mode of message delivery, windows of time during which messages are accepted, URL address of service, permission to invoke other services to act on a message, and rules that modify the invocation of services. These properties and permissions affect the routing of messages from or to the service.

Figure 2:
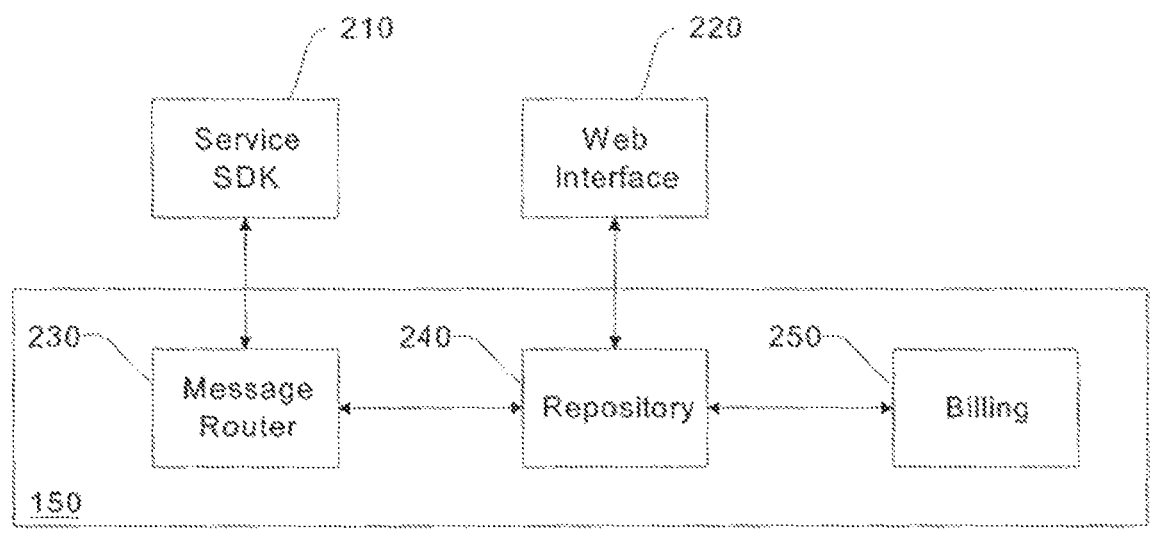
FIG. 2 illustrates components in a message exchange network.

FIG. 2 illustrates the primary functional components that operate within message interchange system 100. The five primary functional components include service software development kit (SDK) component 210, web interface component 220, message router component 230, repository component 240, and billing component 250.

SDK component 210 serves as a foundation for supported development of client applications that interface with message interchange network 150. Owning organizations can use SDK component 210 for custom integration with their software applications. As would be appreciated, SDK component 210 is not required to enable a service to access message interchange network 150. A service can use any development tool or process that would enable the service to leverage the application programming interface (API) that is supported by message router component 230.

In general, SDK component 210 enables the provision of an interface that would be available on most common platforms, and in most popular languages. In this manner, SDK component 210 abstracts away the complex technical requirements of transferring messages using message interchange network 150.

It is a feature of the present invention that SDK component 210 need not have any business logic built into it. SDK component 210 can be used to develop plug-ins to shrink-wrapped applications, thereby greatly reducing development time. As would be appreciated, SDK component 210 can provide convenient libraries and utilities that a service may optionally use to facilitate the (1) creation and reading of messages conforming to the message router component API, and (2) authentication of users of message interchange network 150.

Repository component 240 is the primary database of message interchange network 150. Repository component 240 includes information on customer profiles, message logs, and directories. As will be described in greater detail below, message router component 230 uses repository component 240 to retrieve customer and application information that affects message routing. Message router component 230 also writes message log information to repository component 240 about messages that are processed through message interchange network 150.

Billing component 250 uses the message log information in repository component 240 to derive actual usage of message interchange network 150 by customers, and handles the invoicing and payment collection from customers. It is a feature of the present invention that the billing within message interchange system 100 can be based upon actual customer usage of message interchange network 150. For example, billing component 250 can charge customers based on a per transaction basis. In one embodiment, the per-transaction cost is based on the size of the messages being processed. As would be appreciated, these per transaction costs can be assessed to parties in a variety of ways. For example, the costs can be assessed against the originator of the message, the intermediate services, the recipient of the message, or any combination of those parties. This billing flexibility is in sharp contrast to conventional EAI solutions that generate revenue through software license fees.

Web interface component 220 is the front-end component of message interchange network 150. Web interface component 220 interfaces directly with users by enabling login, registration, account maintenance, directory lookup, rules configuration, reporting, billing, and customer support functionality. The web interface provides online forms for data entry and can perform preliminary validations on the data. Through web interface component 220, the user can also perform queries against repository component 240 for directory lookups or reporting.

It is a feature of the present invention that message interchange network 150 is an open network architecture that not only facilitates the easy introduction of services into the network, but also enables businesses to access a robust suite of services via one connection to the message interchange network 150.

As noted, message router component 230 provides the core function of message routing and delivery within message interchange network 150. In one embodiment, message router component 230 is implemented as an Internet-based message exchange service that provides a transport level messaging service. In other words, message router component 230 need not be aware of the application semantics of a message exchange.

Thus, it is a feature of the present invention that message interchange network 150 need not inherently provide business process modeling. This is in contrast to conventional EAI solutions that may require a continual traversal up and down a protocol stack in routing a message from a sending service to a recipient service. For example, if the protocol stack included transport, routing, transformation, and work flow layers, then each message exchange segment may require analysis and processing at each layer to determine the next service (intermediate or final) that should receive the message.

As noted, services can post messages to and retrieve messages from message router component 230 using an API. This provision of a standardized interface enables parties to easily connect to and use message interchange network 150 without being restricted in the type of message content.

In one embodiment, the protocol for posting and retrieving messages with message interchange network 150 is the Simple Object Access Protocol (SOAP). The SOAP messaging protocol defines a mechanism to pass commands and parameters between HTTP clients and servers. Through this standard object invocation protocol, HTTP is used for transport and XML is used for data encoding. The SOAP messaging protocol does not rely on the use of particular operating systems, programming languages, or object models on either the server side or the client side. As would be appreciated, other protocols can also be supported by message interchange network 150.

It is a feature of the present invention that while the message header uses extensible markup language (XML) syntax, the message body can accommodate any type of data, whether it be text or binary, encrypted or unencrypted. If the message body is also in XML form, then the message body can opt to use a schema based on an industry standard such as ebXML, BizTalk, RosettaNet, OAGIS, or any other suitable standard.

In one embodiment, message exchange through message interchange network 150 is asynchronous. Recipient services can be configured to poll message interchange network 150 for incoming messages, or, if they have their own server, can have message interchange network 150 push messages to them.

After a sending service posts a message to message interchange network 150, one or more in-transit services 130-*p* can operate on the message before it reaches the recipient service. In-transit services can perform useful operations on messages, such as data transformation, enrichment, cross-reference ID mapping, filtering, credit scoring, or the like. Through the standardized interface, in-transit services 130-*p* can independently join the message interchange network 150 and operate on messages. This flexibility encourages independent third parties to build services that can be plugged into message interchange network 150. It is a feature of the present invention that such an open network would encourage third parties to market a data service that generates revenue based upon the level of utilization of the service.

As noted, in-transit services can be included in a message path that begins at a sending service and terminates at a recipient service. As will be described in greater detail below, sending services can explicitly specify a set of services to operate on a given message. In addition, recipient services can specify services that should operate on messages before delivery to the recipient service. In one example, a recipient may always want messages to pass through a filtering service to screen out messages from unknown senders.

Messaging through message interchange network 150 can be as secure as the participants desire. Each service registered with message interchange network 150 can specify a security policy declaring encryption and authentication levels for message interchange network 150 to enforce. For messages that flow through in-transit services, a sender can also specify the permissions for each in-transit service to access or operate on parts of the message.

In one embodiment, message interchange network 150 uses the secure HTTPS protocol to support secure transport connections when a service posts a message or polls for messages, and when message interchange network 150 pushes messages to a client server. Authentication can be based on either username/password or certificates.

SSL encryption as part of HTTP can be used to provide data protection during message transmission over the public Internet. In general, this level of protection is sufficient for most situations. Services can, however, perform their own extra encryption of message documents to keep them private even from message interchange network 150. Services that add extra encryption should ensure, however, that all services that operate on the message documents have the necessary keys to decrypt the documents.

As is well known, the authentication protocol of SSL includes a server's presentation of a certificate to clients. Accordingly, message interchange network 150 presents a server certificate to services that connect for posting or polling. The connecting service has the option of then providing either a username/password or certificate for message interchange network 150 to authenticate the service. The form of client authentication is a configuration option within the profile message interchange network 150 maintains for each service.

When message interchange network 150 pushes messages to a service, the service's server should present a server certificate to message interchange network 150 for authentication of the service. For the reverse authentication, the service can then require either a username/password or certificate from message interchange network 150. Again, that option can be configured in the profile information message interchange network 150 maintains for the service.

As a message flows through a selection of services on the way to the recipient service, and as the recipient service's response returns to the sending service, message interchange network 150 maintains an audit trail of all operations on the message and all services that touched the message. The audit trail serves several purposes. First, it enables message interchange network 150 to reconstruct the message history in the case of queries on the message trail. Second, it allows message interchange network 150 to compile a usage report for any service for reporting and billing purposes.

Figure 3:
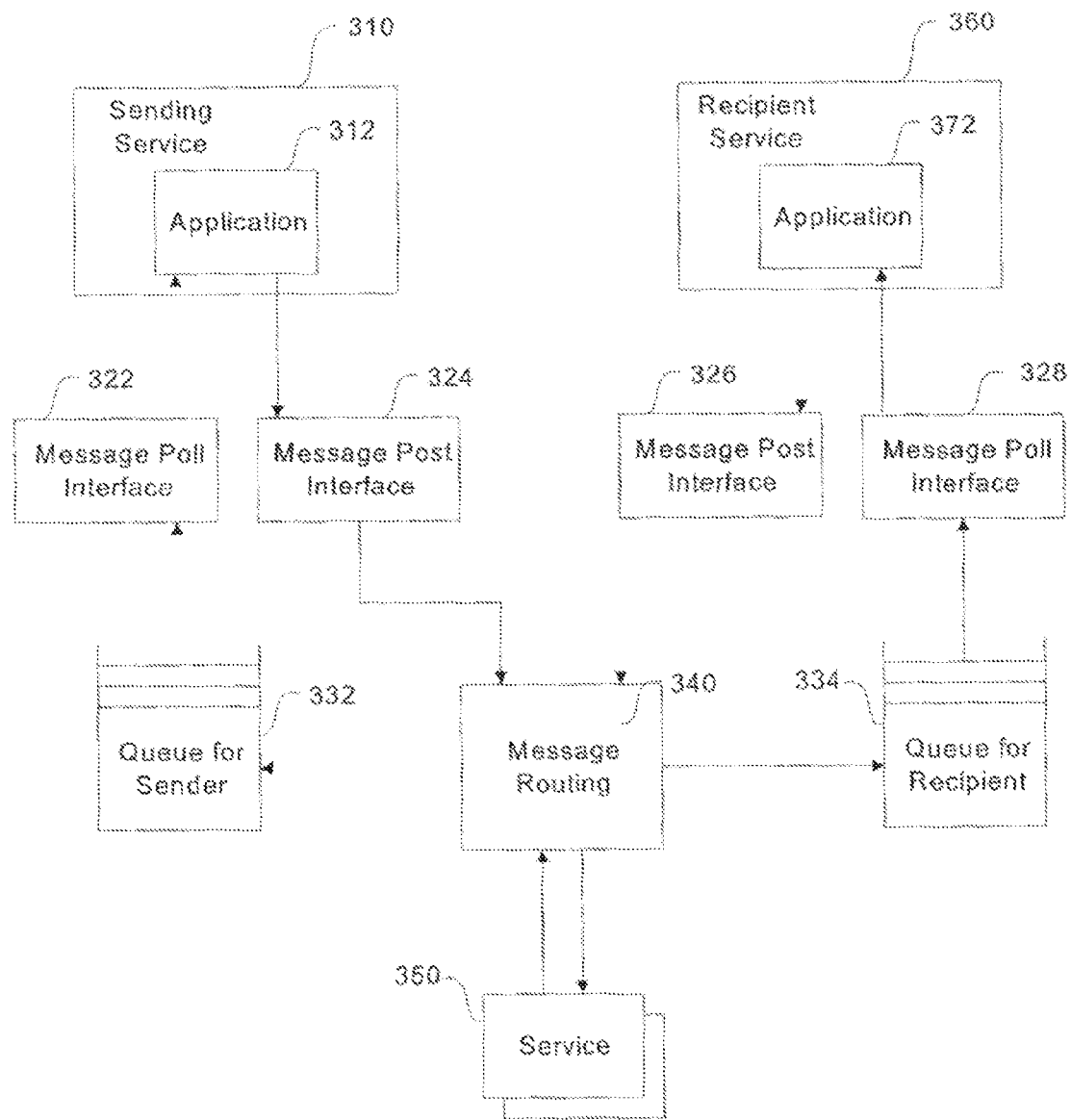
FIG. 3 illustrates a request response pattern.

Having described the general framework of message interchange network 150, a more detailed description of a message transaction lifecycle within message interchange network 150 is provided with reference to FIG. 3.

In this framework, a message can be embodied as a self-contained collection of information to serve a particular purpose, such as a request a response, a notification, or an acknowledgement. As noted, message interchange network 150 can generally be agnostic about the content of a message other than header information that affects routing of the message.

In one embodiment, request, response, and notification messages can be defined. A request message expects a subsequent response message from the recipient(s) to be returned to the sender. Request messages may represent inquiries, but might also represent update requests that only expect a return status response. If an error occurs in routing a request message, message interchange network 150 returns an error response message to the sender.

A response message is issued by a recipient of a request message. The response message references the original request message. Failure of the response message may result in an error response message being returned to the sender of the original request message.

A notification message is a one-way message. No response to the notification message is expected back to the sender.

Message interchange network 150 can regard any response message referencing a notification message as an invalid message. If a notification message fails, no error message is returned to the sender.

As would be appreciated, further messages can be defined for message interchange network 150. For example, a cancel message can also be defined, wherein the cancel message is used by the sender to cancel a previous message.

The operation of these messages is now described with reference to the request/response illustration of FIG. 3. This illustration demonstrates a typical example of a sending service 310, such as an enterprise, making an inquiry to a recipient service 360, such as a webware provider. In one embodiment, a sender's application 312 that connects to message interchange network 150 is a desktop application. In another embodiment, a sender's application 312 that connects to message interchange network 150 is an enterprise server, or an EAI package.

The first step in the message transaction process is the creation of a message. In one embodiment, a sender formats the messages to conform to an XML schema for messages. This XML schema prescribes the format for message headers while allowing any kind of data to be included in the message body (or payload). As part of message construction, sending service 310 specifies the recipient service(s) 360 of the message. In one embodiment, a recipient service's name includes an organization and a specific service provided by that organization. The service name can be generally represented in the message via a globally unique ID.

The actual set of elements contained in a message depend on whether the message is being posted or delivered. In one embodiment, a message includes a header element, a body element and/or attachments. In one embodiment, the attachments are based on multi-part Multipurpose Internet Mail Extensions (MIME).

An embodiment of a message that includes header and body elements is included in Appendix A. In this example, the cardinality of elements is indicated as '?' or {0:1} for an optional instance; '*' or {0:N} for zero or more instances; and '+' or {1:N} for one or more instances. No symbol or {1} represents a required single instance. As would be appreciated, the actual message format can differ depending on the protocol. In particular, protocols other than the SOAP protocol can be used.

The header element includes routing and invocation information. The header as posted by a sending service is often modified by message interchange network 150 for delivery to the receiving service.

The body element includes the documents the sender is sending to the recipient(s). These documents can also be operated upon by one or more services. As noted, the documents can be in the form of XML or any other representation, including text, binary, etc. In one embodiment, all or part of the documents that are being sent are included in an attachment to the message.

While messages will typically have a similar overall structure, the actual composition of elements can differ between the various message types and between messages as posted and as delivered. For example, some elements in a sent message can be changed or not be included in the message as delivered, such as elements particular to constructing a route. Some elements can also be inserted only in the message as delivered, such as identifier elements.

If the sending service wishes to have the message routed through any services before delivery to the recipient service(s), the sending service can specify an explicit sequence of services that should operate on the message. The sender can also implicitly include services in the route for a message through the specification of routing scripts associated with the defining service. Routing scripts are described in greater detail below.

After a message is constructed, the message is posted to message interchange network 150. This process is illustrated in FIG. 3 as the posting of a message by application 312 to message post interface 324. As noted, in one embodiment, the posting of a message is performed using the SOAP messaging protocol.

If sending service 310 posts a message that does not have well-formed XML, the message posting is rejected and an error response is returned. In general, messages can be rejected for a variety of other reasons. For example, a message can be rejected if the service indicated in the message header as the sender is not the same as the actual sender of the message, the message is a duplicate posting of a previous message, a service attempts to reply to a message for which it was not a recipient, or a response message does not reference a prior message.

In one embodiment, each message posted by a service can have a unique handle assigned by the service to identify the message. This unique handle can be used to provide a means for message interchange network 150 to detect duplicate postings of the same message. Duplicate postings can occur in the case of failure recovery by the service. In one embodiment, if a service desires that message interchange network 150 should reject duplicate postings of a message, then the service could provide unique handles for messages and set a "potential duplicate" flag in messages that may be a duplicate posting. It should be noted that regardless of whether or not a service provides a unique handle for a message, message interchange network 150 can assign a globally unique session identifier to each posted message.

After a message is posted, message interchange network 150 routes the message to the recipient service(s) 360. The routing of the message is based upon a route calculation by message interchange network 150. The calculated route includes all intermediary services 350 that are scheduled to operate on the message en route to recipient service(s) 360. The calculated route can be based on routing instructions specified explicitly in the message header and/or on routing scripts pre-defined by the sending service 310, recipient service 360, or any in-transit services 350 that have been included within the calculated route.

In general, routing scripts define a procedure for enabling determination of at least part of a route. This procedure can be based on any type of criteria. For example, a procedure can be defined that determines a next destination of a message based on the existence of one or more attributes of the message. In another example, a procedure can be defined that effects a determination based on the comparison of one or more attributes of the message to a reference value. In yet another example, a procedure can be defined that effects a determination based on pattern matching (e.g., regular expression matching). As would be appreciated, routing scripts can embody any of a variety of criteria-based procedures.

Routing scripts can specify a sequence of services that operate on either inbound or outbound messages for a service. As noted, in-transit services may themselves have routing scripts requiring processing by other services. Therefore, the route calculation can be recursively defined based upon routing scripts specified by all services that interact with the message.

In one example, the sending service 310 may specify a routing script that requires a cross-reference mapping service to be included in the calculated route whenever sending service 310 sends a message to recipient service 360. In another example, recipient service 360 may specify a routing script that requires that any incoming request messages must first pass through a filter service to block messages from a list of sending services 310.

Routing scripts enable sending services to include services into the message route without having to explicitly specify the services in the message itself. Also, routing scripts enable recipient services 360 to require services 350 to be in the calculated route, regardless of the sending service's route specification.

In one embodiment, a routing script is embodied as a routing rule. A routing rule includes two parts: a condition and one or more resultant actions. The conditional part of a rule can be based on any elements or element attributes in a message's header. Additionally, content-based routing can be supported through conditional rules based on attributes of an element in a message's body and/or attachments.

Every rule should have at least one condition. Conditions include an operator and zero or more operands. Example operators include equals, notEquals equalsOneOf, lessThan, greaterThan, and exists operators. In one embodiment, operators act on XML elements, XML attributes, or on other conditions.

From the standpoint of the element operators, XML elements contain either child elements or character data. Therefore, the operands for an element comparison both represent the same type of content: either elements or character data. Character data can be in the form of a string, number, or date. Conditions involving elements that do not appear in the message will evaluate to false.

Attributes always have a type of character data, which can be string, number, or date. Many attributes are implicitly included in an XML document with default values. Therefore, an attribute identified in a condition can refer to either an explicit or implicit attribute. Conditions involving optional attributes that do not appear in the message will evaluate to false.

The usual boolean operators can combine conditions into more complex conditions. Condition operators act on other conditions. Example condition operators include AND, OR, XOR, and NOT condition operators.

The result of satisfying a rule's conditions is that an action will be triggered to modify the route for a message. Probably the most common result of a rule is to add one or more services into the route for a message. Several rule actions can be defined, including but not limited to an AddServiceAfter action, an AddServiceBefore action, an AddService action, a Redirect action, a ChangeTopic action, and a StopRuleEvaluation action.

In an AddServiceAfter action, a service (other than a final recipient service) can add a service after itself in the route. If this action appears more than once in the action list for a rule, the service is added such that the resultant service order is the same as the order of actions.

In an AddServiceBefore action, a service (other than a sending service) can add a service prior to itself in the route. If this action appears more than once in the action list for a rule, the services are added such that the resultant service order is the same as the order of actions.

The AddService action is identical to either the AddServiceAfter action or the AddServiceBefore action depending on the role the service has with respect to the message. For message senders, the services are added after the sender; for message recipients, the services are added prior to the recipient; for in-transit services, the services are added prior to the including service. This action generally enables rules that are useable by a service independent of role.

In a Redirect action, a service may wish to have the message redirected to another service in its place as the receiving service for the message. For example, a service may be a virtual service, and needs to redirect messages for that service to another service.

In a ChangeTopic action, if a first service includes a second service into the route or performs a redirect for a third service, then the first service can also change the topic of messages sent to the second service or the third service. The topic change will only apply to messages as delivered to the second service or the third service, and will revert to the original topic for subsequent service in the message route.

The StopScriptEvaluation action terminates the evaluation of subsequent scripts for the same service. Script evaluation will then continue for the next service in the route.

A service should maintain an evaluation sequence for the scripts associated with each role that the service can have with respect to a message. That sequence determines the order in which the scripts for that service are applied.

In one embodiment, scripts are evaluated in the following order: (1) scripts for the sender of the message; (2) scripts for services included by the scripts for the sender (this is recursive); (3) scripts for the recipients of the message, in the order of recipients in the message header, and (4) scripts for services included by scripts for the recipients (this is recursive).

When multiple scripts for a service include services into a route, the order of services in the route will follow the order of the scripts. That is, if script 1 inserts service A, and script 2 inserts service B, and if script 1 is evaluated before script 2, then service B follows service A in the route.

In one embodiment, routing scripts are evaluated only once during the initial calculation of the route for a message. The message header contains the basic information to initially construct a route, such as sending service 310 and recipient services 360. The message can also contain an explicit specification of a set of services to include in the route. Once the route is constructed from the header information, routing scripts are applied to further elaborate the route.

In an alternative embodiment, at least part of the message route is calculated after the physical routing of the message has begun. Dynamic routing is described in greater detail below in the context of physical and logical routing.

At the transport level, message interchange network 150 routes a message to a service by delivering the message through the Internet to a physical machine on which the service resides. That service operates on the message and, if the message is a request, returns a response message back through the Internet to message interchange network 150. The sequence of message deliveries and responses between message interchange network 150 and services represents the physical routing of a message.

Message interchange network 150 also provides a mechanism for a service to act on a message without the message being physically delivered to the service over the Internet. This mechanism is enabled through the logical routing of the message to the service. With logical routing, a service can modify the routing of the message or modify the context of the message for delivery to the next service. Significantly, a service can be logically included in a message routing, without being included as part of the physical routing of the message.

In one embodiment, logical routing of messages is implemented through the specification of routing scripts. As described above, a service can define one or more routing scripts. These defined routing scripts are stored within message interchange network 150 and are processed to determine what routing behavior should occur when a message is logically routed to the service.

Logical routing can take place statically or dynamically. With static logical routing, a message is logically routed to all services prior to any physical routing. In other words, message interchange network 150 logically routes the message to all services prior to the physical delivery of a message to any services. This logical routing is represented by the sequential evaluation of the routing scripts that are defined by those services. As noted above, in one embodiment, the routing scripts are evaluated in the following order: (1) scripts for the sender, (2) scripts for the services included by the sender (recursive), (3) scripts for the recipient, and (4) scripts for the services included by the recipient (recursive).

In dynamic logical routing, the logical routing is not completed prior to the start of the physical routing. Rather, die logical routing takes place in sequence with the physical routing of the message. The relation between logical routing and physical routing is described in greater detail below.

As noted, message interchange network 150 delivers a message logically to every service participating in a message's routing. Of those services, some subset will also accept physical delivery of the message.

To illustrate this concept, consider an example where service A includes service B into the message route. Service A can include service B into the route either prior to itself in the route (provided service A is not the originator of the message) or after itself in the route. In either case, message interchange network 150 would logically route the message first to service A, which includes service B into the route. Message interchange network 150 then logically routes the message to service B, and after service B produces a response, message interchange network 150 logically returns the response to service A. The point at which service A physically receives the message depends on whether service A included service B prior or after itself in the route. If service A includes service B prior to itself in the route, then the order of physical delivery is first to service B then to service A. Conversely, if service A includes service B after itself into the route, then the order of physical delivery is first to service A then to service B. In the latter case, the response from B is not necessarily physically delivered back to service A. Rather, it may be only logically delivered back to service A.

Services to which a message is logically routed do not necessarily have to also physically receive the message. In the above example, service A could have been logically routed, with physical delivery only to service B. Consider the following scenario. Suppose service X includes service A into the route and service A includes service B into the route. The logical routing of the message would proceed from service X to service A to service B back to service A back to service X. Service A can choose not to be included into the route for physical delivery, in which case the physical routing of the message is from service X to service B.

In general, the act of routing a message (physically or logically) to a service can be thought of as an invocation of the service. When a service includes another service into the route of a message, the including service is effectively invoking the included service. The invocation of a service does not necessarily imply the physical delivery of information to the invoked service. The logical routing of a message is then the logical invocation of services. A route that includes a progression of services including other services can effectively be modeled as a progression of invocations.

In logical routing, each service is not only able to manage the inclusion of other services into the route but is also able to manage the context of those inclusions. From the standpoint of invocations, an invoking service is able to set the context for the invocation. An invoked service can also set the context of its return.

It is a feature of the present invention that message interchange network 150 effects context management on behalf of invoking services. As noted, while an invoking service can be logically included in a message routing, it need not be included as part of the physical routing of the message. In general, message interchange network 150 persistently stores contexts of a message, thereby enabling proper restoration of contexts upon return from an invocation.

In various embodiments, invocation context can include such information as the identity of the invoker service, arguments to the invoked service, a session identifier for the message, a topic for the message, billing responsibility for the invocation, or any other information that can be used by the invoked service. When a service is invoked, it receives a context from its invoker. That invoked service can then modify, if desired, parts of the context when invoking yet another service. Upon return from an invocation, message interchange network 150 automatically restores the context of an invoker to the state prior to the invocation. In one embodiment, the context of an invocation is included in the header information of the message delivered to a service. In another embodiment, the context of an invocation is based on one or more parts of a message.

Responses from invocations also contain context, such as the completion or error status of the response. When a service receives a returned response from an invocation, the context of the invoker is augmented by the context of the response. That service can then optionally modify the response context when returning to its invoker. It should be noted that just as logical routing can occur either statically or dynamically, context propagation (for both invocation and response) can also occur either statically or dynamically.

The ability of service to manage the context of their invocations provides a way for services to assume a large degree of control over the scope of their participation in handling a routed message. For example, a service can choose to isolate its invoked service from being aware that the invocation occurs as part of a broader message routing. A service can choose to assume responsibility for charges incurred by subsequent nested invocations. A service can also choose whether or not to expose a received error condition up the invocation chain.

Message interchange network 150 can also use the invocation contexts to track messages and determine responsibility for invocations. Based on invocation contexts, message interchange network 150 can reconstruct the history of a message necessary for auditing and billing, as well as for reporting.

Having described a framework for logical routing and invocation of services, the description of the physical routing process is continued with reference to FIG. 3. In this example, it is assumed that static logical routing has produced a route for the message.

After deriving the route for a message, message interchange network 150 validates the route. There are numerous conditions that can cause a route to be invalid. For example, there may be routing permission violations or a service may be currently disallowed by message interchange network 150 due to, for example, the non-payment of usage bills.

If the route is determined to be invalid, then message interchange network 150 rejects the posted message and may return an error to the sending service 310 either in the response to the posting call or in an error message.

Message interchange network 150 routes the message to all services in the calculated route. In the event of failure at any stage in the routing, message interchange network 150 aborts the message routing and, if the original message was a request, returns an error message back to sending service 310. For messages with multiple recipients, an error in the routing to one recipient will not necessarily affect routing to other recipients. Errors during routing can occur due to several circumstances. For example, a message may fail to reach a recipient within the expiration time for the message, a service may fail to return a reply to a delivered message, or a service, may return an error status for a message.

Message interchange network 150 sequentially delivers a message to each service identified in the message route. In FIG. 3, this process is illustrated as a flow of the posted message through message routing element 340, and on to one or more services 350. In one embodiment, message interchange network 150 includes all of the message documents in the message delivered to service 350, even if service 350 only expects to operate on one document or documents of a particular content-type. Service 350 would ignore documents that it does not expect.

As noted, message interchange network 150 invokes in-transit services in the same way as delivering a message to any sending or recipient service. In general, a service does not necessarily need to be aware whether it is being invoked as an in-transit service or as a recipient service.

After processing the message, service 350 sends the results in a response message back to message interchange network 150. If service 350 is unable to produce a valid result for its operation on a message, then service 350 may return an error code in its response message to message interchange network 150. If service 350 fails to respond to a received message, the message will ultimately expire, and message interchange network 150 may return an error message back to the sending service 310.

Upon receipt of the response message from service 350, message interchange network 150 then routes the message to the next destination (e.g., another service 350) on the routing list. After passing through each of the intermediate destinations on the routing list, the message is then stored in queue 334 for recipient service 360. It should be noted that queues can also be associated with in-transit services 350. For simplicity, these queues are not shown in the illustrated embodiment of FIG. 3.

Application 372 in recipient service 360 can retrieve the message from queue 334 via message poll interface 328. In the poll mode, application 372 periodically issues a call to message poll interface 328 to ask for any waiting messages. If there are queued messages waiting for delivery to that service, then the one or more messages are returned in a reply. When making poll requests, a service can provide selectors on the messages to fetch. For example, a service can retrieve messages based upon the sender, message type, topic, etc.

In an alternative embodiment, message delivery is enabled through a push mode. In the push mode, the recipient would have its own server to which message interchange network 150 can send messages. A service can specify a maximum number of tries, as well as the retry interval, for message interchange network 150 to send the message to the service before aborting pushed delivery. A service to which message interchange network 150 pushes messages can also optionally poll for messages.

In the push mode, a service can also specify a delivery window in which it will accept pushed messages. For example, a service might only accept messages between the hours of 1 AM and 2 AM.

As further illustrated in FIG. 3, a response message can be posted by recipient service 360 to message post interface 326. The message is then routed through one or more services 350 prior to being stored in message queue 332. The message can then be retrieved by sending service 310 through message poll interface 322. As noted, the return path would not necessarily match the forward path.

In one embodiment, the sender of a message can specify a time by which the routing of a message must complete. If that expiration time passes before delivery of the message to it final destination, message interchange network 150 will abort further routing of the message. In one embodiment, the final destination for a request message is the delivery of a response message back to the original request sender. In this embodiment, senders of response messages cannot specify an expiration since the response is considered part of the routing of the original request message. If a request message expires, message interchange network 150 will return an error response back to the sender. If the sender does not specify an expiration time, then a default message expiration time (e.g., 48 hours) can be used. It should be noted that message expiration is not the same as document expiration. Document expiration is associated with a specific document and indicates how long the document's information is valid.

As part of the message delivery process, message interchange network 150 logs all posted messages, including invalid messages. For each message, message interchange network 150 logs relevant information to track the history of the message. Message interchange network 150 also maintains a correlation between messages. That is, for request messages, message interchange network 150 associates the log of the response message(s) with the log of the request message.

In one embodiment, logged information can include the message header, the calculated route for the message (unless route calculation fails), the status of route validation, the size of the message at each stage of the route, and the routing history, including the status for each service along the message's route. The status values for each service depends on the role of the service.

Message interchange network 150 correlates all messages for the same message transaction. That is, for request messages, message interchange network 150 associates the log of the response message(s) with the log of the request message. Similarly, if a message causes an error message, then message interchange network 150 associates the log of the generated error message with the log of the original message.

Having described a general framework of operation of message interchange network 150, an example message sequence is provided to illustrate the concepts described above. In the example message sequence illustrated in FIG. 4, a message is routed from sender 402 to recipient 404. During this message routing, the message is also passed through in-transit services 406, 408, 410, and 412. The specific operation of services 406, 408, 410, and 412 will become apparent through the description of the message operation sequence.

In the illustrated example, sending service 402 represents a business named MyBiz.com. MyBiz.com desires to send a purchase order to The Acme Company, which operates as recipient service 404. Before being delivered to The Acme Company, the purchase order message is sequentially routed by message interchange network 150 through Transmatics (XSLT) service 406, XpandiCo service 408, Transmatics (replaceElement) service 410, and KeepEmOut.com service 412.

In general, services 406, 408, 410, 412 are operative to perform transformations, enrichment, and filtering functions on the purchase order message. In the present example, Transmatics (XSLT) service 406 is operative to transform address data in the message body, Xpandico service 408 is operative to augment a zip-code address, Transmatics (replaceElements) service 410 is operative to relate sets of values from disparate data sources, and KeepEmOut.com service 412 is operative to filter messages for The Acme Company.

As noted, services 406, 408, 410, 412 can be added to a routing list based upon routing scripts that are created for one or more of sending service 402, recipient service 404, or in-transit services 406, 408, 410, 412. In the present example, services 406, 408, and 410 are added to the route list in accordance with routing scripts defined for sending service 402, while service 412 is added to the route list in accordance with routing scripts defined for recipient service 404. An example embodiment of the message sequence between services in the routing list is now provided.

As noted, in one embodiment, a message includes a header element, a body element and/or attachments. In general, the header element includes the basic delivery information for the message, and the body element/attachments includes the document(s) the sender is sending to the recipient. As would be appreciated, further message elements can be defined. For example, in another embodiment, a message would include header, body, routing, and route trace elements. Here, the routing element includes a listing of a sequence of services that should operate on the message prior to delivery to the recipient, and the route trace element includes the routing history information.

Appendix B.1 illustrates an example of a message that is posted by MyBiz.com to message interchange network 150. As illustrated, the message includes a header element at lines 4-17 and a body element at lines 18-28.

The header element at lines 4-17 includes elements To, From, and Expiration. To element also includes two Service elements, one of which includes the element Arguments. As illustrated, one of the Service elements identifies the recipient service "TheAcmeCompany/Supply," the service that is representative of recipient 404 in FIG. 4. The element Arguments provides parameters that further specify what the "TheAcmeCompany/Supply" service is to perform (i.e., ProcessPurchaseOrder).

As illustrated, at line 14, the From element includes a service identifier for MyBiz.com (i.e., "386b4520f489c217"). Finally, at line 16, the Expiration element specifies a time by which the message should complete its routing.

The body element of the message is located at lines 18-28. In this message element, the purchase order data is included at lines 21-25. As will be described below, the purchase order data can be transformed and enriched by services in the routing list.

As noted, the sender can specify an explicit sequence of services that should operate on the message. The sender can also implicitly include services in the routing list for a message through the specification of routing scripts associated with the defining service. In the example message of Appendix B.1, no services are explicitly identified in the message. Rather, the services are included based on routing scripts that are defined by the various services. In the present example, the routing list includes, in order, Transmatics (XSLT) service 406, XpandiCo service 408, Transmatics (replaceElement) service 410, and KeepEmOut.com service 412.

The first service on the routing list is the Transmatics (XSLT) service 406. In the present example, service 406 is included in the routing list based upon a routing script defined for sender 402. Transmatics (XSLT) service 406 is a transformation service that uses the Extensible Stylesheet Language Transformations (XSLT) language.

Generally, XSLT is a language for transforming XML documents into other XML documents. XSLT is designed for use as part of the XSL, which is a stylesheet language for XML. In addition to XSLT, XSL includes an XML vocabulary for specifying formatting. XSL specifies the styling of an XML document by using XSLT to describe how the document is transformed into another XML document that uses the formatting vocabulary.

In the present example, Transmatics (XSLT) service 406 is operative to transform data in the purchase order message. This transformation is illustrated in Appendix B.2, which shows the purchase order message as it is delivered to XpandiCo service 408 after being processed by Transmatics (XSLT) service 406. More specifically, the transformation operation is illustrated upon comparison of the Address element at line 25 of the message in Appendix B.1 to the Address element at lines 24-28 of the message in Appendix B.2. In this transformation process, an Address element including the entire address has been transformed into an Address element that includes further child elements (i.e., Street, City, and Zip) directed to components of the Address.

As can be appreciated, this transformation process can be used to ensure that the purchase order to be delivered to a particular recipient service 404 is placed in the proper format. If other recipients require a purchase order to appear in different formats, then further transformation operations can be defined and implemented by a service attached to message interchange network 150.

After the message is processed by Transmatics (XSLT) service 406, it is then sent to the next service on the routing list. In this example, the next service on the routing list is XpandiCo service 408.

As illustrated in Appendix B.2, the message delivered to XpandiCo service 408 includes Header and Body elements that are similar to the corresponding elements in the message that was posted by MyBiz.com.

The Header element in the message delivered to XpandiCo service 408 also includes a Session element and a Token element. The Session element at line 4 includes a unique session identifier (i.e., "34b9f6d0-89eb-b5e1-0022-a376bf41c165") that is assigned by message interchange network 150 to the message. This unique session identifier enables tracking of the message through the routing network. The Token element at line 5, on the other hand, is a unique reference identifier (i.e., "84e309b38c56a18cb9835203") that enables message interchange network 150 to uniquely identify a delivered message in the routing network. This unique identifier serves as a message reference in response messages.

As further illustrated in Appendix B.2, the To element, at lines 6-12, includes the service identifier (i.e., "3340f32c035d7499") for XpandiCo as well as the enrichment operation that is desired to be invoked. Specifically, at line 7, the purchase order message identifies the "zipPlus4" operation. The "zipPlus4" operation is an example of an enrichment operation, wherein a 5-digit zip code is expanded to a 9-digit zip code.

After the "zipPlus4" enrichment operation is completed, XpandiCo service 408 returns a response message to message interchange network 150. The returned response message is illustrated in Appendix B.3. As appears at line 19 of the message, the Zip child element of the Address element has been modified to include a 9-digit zip code.

After XpandiCo service 408 returns a response message to message interchange network 150, the message is then forwarded by message interchange network 150 to the Transmatics (replaceElement) service 410. In general, Transmatics (replaceElement) service 410 provides a cross-reference ID mapping function. This function provides the ability to relate sets of values from disparate data sources to each other. These related values are stored persistently by the cross-reference service 410 and can be substituted for each other whenever a message travels from one of the sources to another.

This cross-reference function is especially useful for relating key or ID values of two independent data sources. For example, consider a scenario where two different services independently maintain a customer contact list for the same customer, in this case, it would be difficult for each service to process a change message from the other without a cross-reference map because the receiving service would have no explicit way of knowing which record to update. By using cross-reference service 410, however, the receiving service's record ID could be automatically substituted for the sender's record ID, thereby enabling the receiving service to easily process the message and update the correct record.

In one embodiment, a cross-reference map actually stores a set of records for each service sharing a cross-reference map. Each record can include an arbitrary number of name/value pairs, although one of them is identified as the key. Records from different services can then be related to each other in one of two ways. In one method, different services can be related to each other explicitly by relating two key name/value pairs from different services. In another method, services can be related to each other automatically by having the cross-reference service 410 process the response to a message as well as the originating message.

As would be appreciated, the cross-reference map can be queried later by specifying a specific service, key name, and key value. The extracted name/value pairs from all related records can then be used to transform a message.

Figure 4:
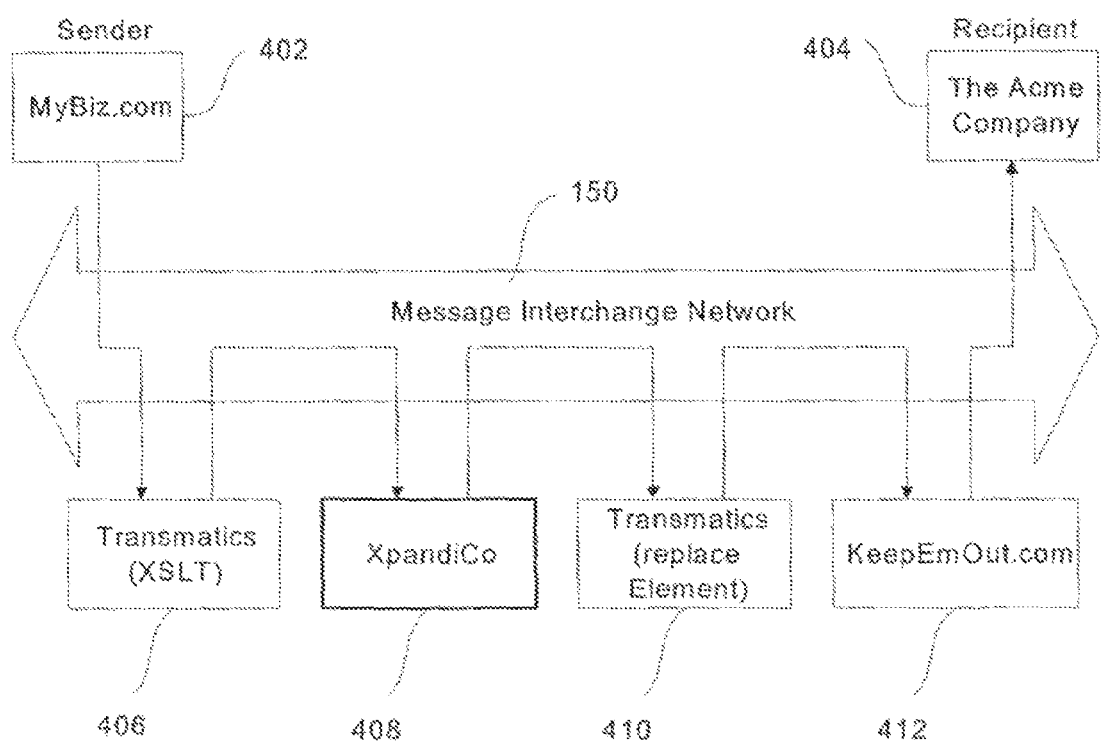
FIG. 4 illustrates a message flow sequence.

In the example of FIG. 4, Transmatics service 410 is being called upon to perform a replaceElement operation on the CustomerNumber. After the CustomerNumber is replaced with a number that is recognized by The Acme Company, Transmatics service 410 returns a response message to message interchange network 150. As illustrated in Appendix B.5, the customerID element at line 23 has been changed to "BX0045012" from the previous customerID value of "3489."

After the replaceElement operation has been performed by Transmatics service 410, the message is then forwarded to KeepEmOut.com service 412. KeepEmOut.com service 412 performs a message filtering service by ensuring that The Acme Company will only receive messages from authorized entities. As such, KeepEmOut.com service 412 can be included into the routing list based on a routing script that has been defined by The Acme Company.

If the message passes through KeepEmOut.com service 412, then the message is finally delivered to The Acme Company service 404. An example message as delivered to The Acme Company is illustrated in Appendix B.4. An example of a response message by The Acme Company to MyBiz.com is also illustrated in Appendix B.5.

As thus described, message interchange network 150 enables flexible interaction with third-party services. The connection of these third-party services to an open platform enables enterprise customers to flexibly define their message transaction framework. As will be described in greater detail below, message interchange network 150 can also be used to enable flexible interaction between enterprise customers and their ASPs.

In general, the distribution of an enterprise's information among ASPs requires a security framework by which each ASP can authenticate access to that enterprise's information by another ASP. In a point-to-point-messaging model, the conventional approach is to embed the authentication information (encrypted) in the message itself or in some challenge protocol. In a collaborative environment, this authentication approach suffers several disadvantages. First, the originator of a message may be an ASP acting on behalf of an enterprise, and will therefore be unaware of the authentication credentials to present to the recipient ASP. Second, the authentication credentials are applicable only to the recipient ASP and do not authenticate access of other services in the message's route. Third, many systems use standard HTTPS-based authentication, which requires synchronous invocation of the recipient. Polling for messages would therefore be disallowed. Finally, services along a message's route that operate on the message's content should not have visibility to the authentication information.

In accordance with the present invention, message interchange network 150 authenticates each service that participates in a message's route. Message interchange network 150 can then provide an authentication token that substitutes for an enterprise's authentication credentials. The proposed token is an identifier (GCID) that represents an authenticated service to the enterprise's account with a specific ASP. An ASP that receives a GCID in a message only needs to authenticate message interchange network 150 since message interchange network 150 has already authenticated the message sender. The ASP can either have an internal map between the GCID and enterprise account identifier, or can require the account identifier to accompany the GCID.

If the ASP does not want to maintain its own internal mapping between an enterprise's GCID and the enterprise's account, then the ASP would provision the enterprise's account identifier to message interchange network 150. Message interchange network 150 would then insert the account identifier with the GCID in any subsequent messages from the enterprise to ASP 620.

For both an enterprise and ASP to trust a GCID provided by message interchange network 150, the GCID should be validated by both organizations as representing the enterprise's account on the ASP. Setting up this trust relationship is accomplished through a provisioning process that is completed prior to the routing of messages between the enterprise and the ASP. The process of provisioning a trusted GOD in message interchange network 150 involves two authentication steps: the enterprise first authenticates itself to message interchange network 150 and receives a GCID, then the enterprise authenticates itself to the ASP and associates the GCID with the enterprise's account.

Figure 6:
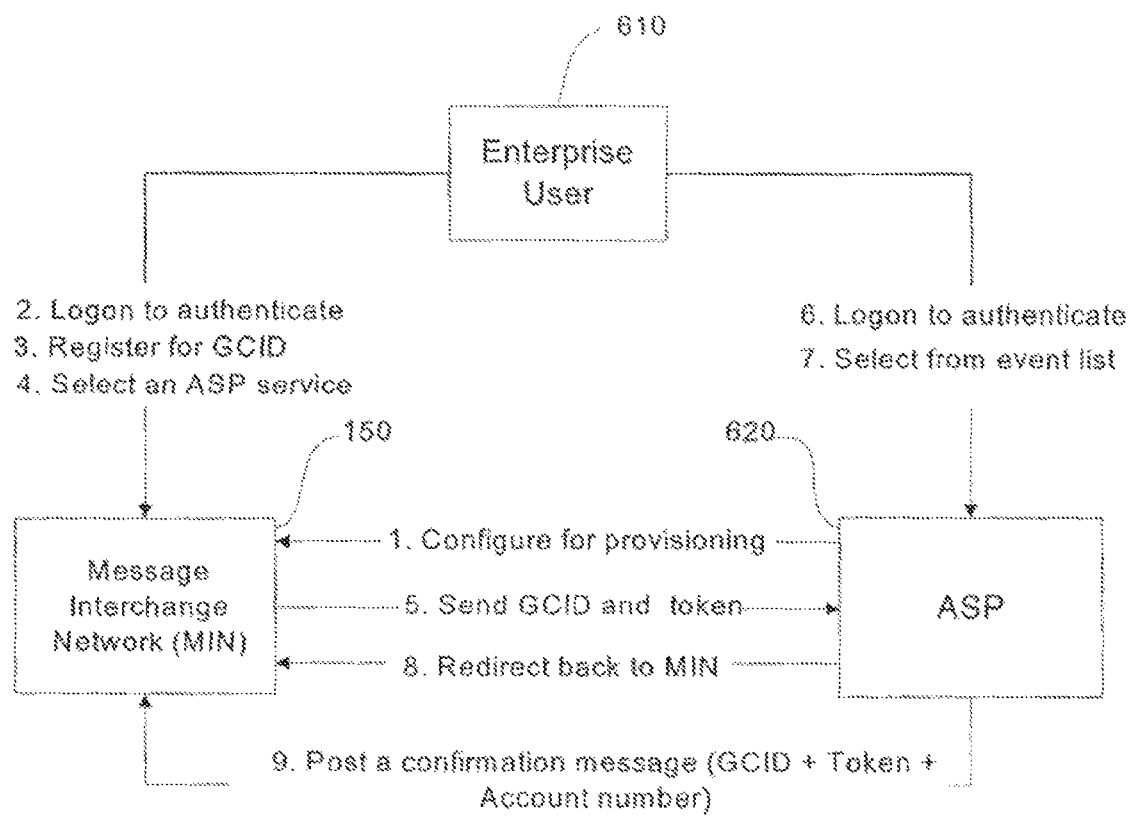
FIG. 6 illustrates a provisioning process.

FIG. 6 illustrates an embodiment of the provisioning process. It should be noted that in the illustrated embodiment of FIG. 6, it is assumed that the enterprise and the ASP have already registered with message interchange network 150.

The provisioning process begins at step (1) where ASP 620 registers with message interchange network 150, alerting message interchange network 150 that its service requires provisioning. In this process, ASP 620 provides a URL to message interchange network 150. The provided URL enables an enterprise user 610 to logon to the ASP's website for provisioning.

At step (2), enterprise user 610 logs in to the message interchange network's web site. This authenticates enterprise user 610 with message interchange network 150. Enterprise user 610 then registers for a GCID at step (3). This GCID will represent an authenticated entity that can both send and receive messages through message interchange network 150. At step (4), enterprise user 610 selects a service from the message interchange network directory representing an ASP with whom the enterprise has an account.

At step (5), message interchange network 150 then automatically redirects enterprise user 610 to a website at ASP 620. In this process, message interchange network 150 sends the enterprise's GCID and a provisioning token to the web page.

In one embodiment, message interchange network 150 passes a GCID, a provisioning token, and a return URL as a query string in the ASP's URL using three parameters: serviceID—an 8 byte hex number representing the GCID registered by an enterprise user; token—an 8 byte hex number representing a unique token to be returned in the confirmation message from the ASP back to message interchange network 150; and returnURL—a URL string representing where the user should be redirected to after completing the authentication and provisioning process at the ASP website.

An example of a redirect URL would be:

```
https://www.asp.com/gc?serviceID=345023ba2300d353&token=
    459012c9a78b90af&returnURL=https:
    //www.grandcentral.com/provisioning/auth.jhtml
```

On the ASP's website, enterprise user 610 logs in to ASP 620 at step (6), thereby being authenticated by ASP 620. ASP 620 will then recognize the validity of the GCID as representing enterprise 610. At step (7), the ASP's website can optionally allow enterprise user 610 to select events (if any) for which the ASP's service should send notification messages to the enterprise's GCID.

After authenticating enterprise user 610 and allowing enterprise user 610 to select events, the ASP website redirects enterprise user 610 back to the message interchange network website at step (8). Next, at step (9), ASP 620 posts a message to message interchange network 150 indicating that ASP 620 has accepted the enterprise user's authentication of the GCID. In one embodiment, the message contains both the GCID and the provisioning token originally sent to the ASP's webpage by message interchange network 150. In general, this back-channel confirmation, as opposed to returning a confirmation in a URL redirect back to message interchange network 150, prevents spoofing of the confirmation.

In one embodiment, ASP 620 posts the confirmation message to message interchange network 150 using the message interchange network messaging protocol. Message interchange network 150 would expect specific values in some of the message elements. An example of a confirmation message (showing only the relevant message elements) is shown below. As would be appreciated, the actual values of the arguments and document content would be dependent on the specific provisioning circumstances.

```
<Message>type="request">
    <Header>
        ...
        <To>
            <Service>name="grandcentral/provisioning">
                <Arguments>
                    <![CDATA[
                        <token>459012c9a78b90af</token>
                        <gcid>63801c78327fd901</gcid>
                        <operation>name="setPermission">
                            <parameter>include</parameter>
                        </operation>
                        <operation>name="setCookie"/>
                    ]]>
                </Arguments>
            </Service>
        </To>
        ...
    </Header>
    <Body>
        <Document>id="COOKIE">content-
            type="text/xml">encoding="none">
            <![CDATA[
                <!-->insert>enterprise>account>information>-->
            ]]>
        </Document>
    </Body>
</Message>
```

The values for the GCID and token parameters in the arguments should be the values received via the web interface redirection. The cookie parameter (and the document in the message body) can be omitted from the confirmation message if ASP 620 maintains the map between the GCID and enterprise account identifier. Otherwise, the contents of the document element should be whatever text or XML ASP 620 requires to determine the enterprise's account identifier.

In general, a service can register a block of text or XML (referred to as a cookie) that message interchange network 150 is to include with a message whenever a message is delivered to the service. This cookie is analogous to cookies in web browsers. An example of a cookie is account information that a service requires when receiving a message from particular sources. This eliminates the need for the sender of a message to include, or even be aware of, this information when sending the message.

If enterprise user 610 fails authentication by ASP 620, ASP 620 should not send a confirmation message to message interchange network 150. ASP 620 should, however, provide immediate feedback to enterprise user 610 on the web page that authentication failed.

After processing the confirmation message, message interchange network 150 returns a status response to ASP 620. The status element in the response message will be absent in the case of a success and otherwise will contain an error code.

In one embodiment, message interchange network 150 must receive the confirmation message from ASP 620 within 24 hours after enterprise user 610 initiates provisioning a GCID. If message interchange network 150 does not receive the confirmation within that time period, then the provisioning token will expire. If message interchange network 150 receives a confirmation message after the token has expired, message interchange network 150 would not recognize the confirmation and would return an error back to ASP 620. If no confirmation is received, message interchange network 150 would not notify either ASP 620 or enterprise user 610 about the expiration of the provisioning token.

In an alternative embodiment of the provisioning process, ASP 620 provides a launch point from its own website for provisioning. ASP 620 could then redirect a user originally at the ASP site over to the message interchange network site to register tor a GCID. In this embodiment, step (8) would not be necessary after message interchange network 150 redirects the user back to the ASP's site.

It is a feature of the present invention that the provisioning process can set up a trust relationship between the enterprise and the ASP. When ASP 620 returns the provisioning confirmation message to message interchange network 150, ASP 620 is indicating that its service trusts the enterprise's GCID for sending messages and trusts all of the enterprise's GCIDs for receiving messages. Similarly, by this provisioning process, the enterprise is indicating trust of ASP 620 for sending and receiving messages.

It should be noted that if an ASP does not wish to expose the notion of accounts (i.e., messages to the ASP are not account-specific), or if the ASP does not wish to exploit the message interchange network's authentication framework, then the ASP may choose not to require authentication of an enterprise's GCID to a specific account in the ASP, and this provisioning process is not required.

If ASP 620 wants to revoke the authenticated association between an enterprise's GCID and the enterprise's account in ASP 620, ASP 620 can simply cease to recognize the association between the GCID and account. In this case ASP 620 would return an error response whenever it receives a message from that GCID. ASP 620 can also use the message interchange network website to unset permissions granted by ASP 620 to the enterprise. Message interchange network 150 would then not allow the enterprise's GCID to send messages to ASP 620.

Alternatively, ASP 620 can send a request message to message interchange network 150 to revoke the previously provisioned permissions and cookie. In one embodiment, this message would contain the following information:

```
<Message>type="request">
  <Header>
    ...
    <To>
      <Service>name="grandcentral/provisioning">
        <Arguments>
          <![CDATA[
            <gcid>63801c78327fd901</gcid>
            <operation>name="clearPermission">
              <parameter>include</parameter>
            </operation>
            <operation>name="clearCookie"/>
          ]]>
        </Arguments>
      </Service>
    </To>
    ...
  </Header>
  <Body/>
</Message>
```

The effect of this revocation message is that message interchange network 150 automatically revokes all permissions granted by ASP 620 to the enterprise, and message interchange network 150 removes the mapping of the enterprise's GCID to ASP's cookie in the message interchange network registry.

After processing the revocation message, message interchange network 150 returns a status response to ASP 620. The status element in the response message is absent in the case of a success and otherwise will contain an error code.

After an enterprise provisions a trusted GCID between an enterprise and an ASP's service, the GCID becomes a mapped service representing the ASP's service specific to the enterprise's account. The following scenarios illustrate how this GCID would be used in various messaging situations.

First, assume that the enterprise wishes to send a message to the ASP specific to the enterprise's account with the ASP. The enterprise should then send a message to its mapped service for the ASP:

```
<Message>
  <Header>
    <From>
      <Service>gcid="enterprise"/>
    </From>
    <To>
      <service>gcid="enterprise/mappedService"/>
    </To>
  </Header>
</Message>
```

This would be translated by message interchange network 150 for delivery to the ASP:

```
</Message>
  <Header>
    <From>
      <service>gcid="enterprise/mappedService"/>
    </From>
    <To>
      <Service>gcid="asp/service">
        <Cookie><![CDATA[account=12345]]></Cookie>
      </Service>
    </To>
  </Header>
</Message>
```

It should be noted that the enterprise could send the message directly to the ASP rather than to the mapped service, and the cookie would still be inserted correctly by message interchange network 150. The advantage for the enterprise in sending the message to the mapped service rather than directly to the ASP is to facilitate a consistent tracking of invocations of the ASP whether from the enterprise or from another ASP on behalf of the enterprise.

In a second scenario, assume that an enterprise has accounts with more than one ASP. When integrating the exchange of information between these ASPs, the enterprise may allow one ASP to send requests or notifications to another ASP on behalf of the enterprise. With mapped services, the ASPs do not actually need to know each other specifically. A first ASP would send a message to the enterprise's service mapped to the second ASP:

```
<Message>
  <Header>
    <From>
      <Service>gcid="asp1/service"/>
    </From>
    <To>
      <service>gcid="enterprise/mappedService"/>
    </To>
  </Header>
</Message>
```

This would be translated by message interchange network 150 for delivery to the second ASP:

```
</Message>
  <Header>
    <From>
      <service>gcid="enterprise/mappedService"/>
    </From>
    <To>
      <Service>gcid="asp2/service">
        <Cookie><![CDATA[account=12345]]></Cookie>
      </Service>
```

```
        </To>
    </Header>
</Message>
```

Note that the message as delivered to the second ASP hides the identity of the first ASP. In effect, message interchange network 150 effects a virtual proxy service in mapping between services. Accordingly, if the message is a request, then the second ASP's response message would be returned to the enterprise's mapped service and redirected to the first ASP.

Figure 5:
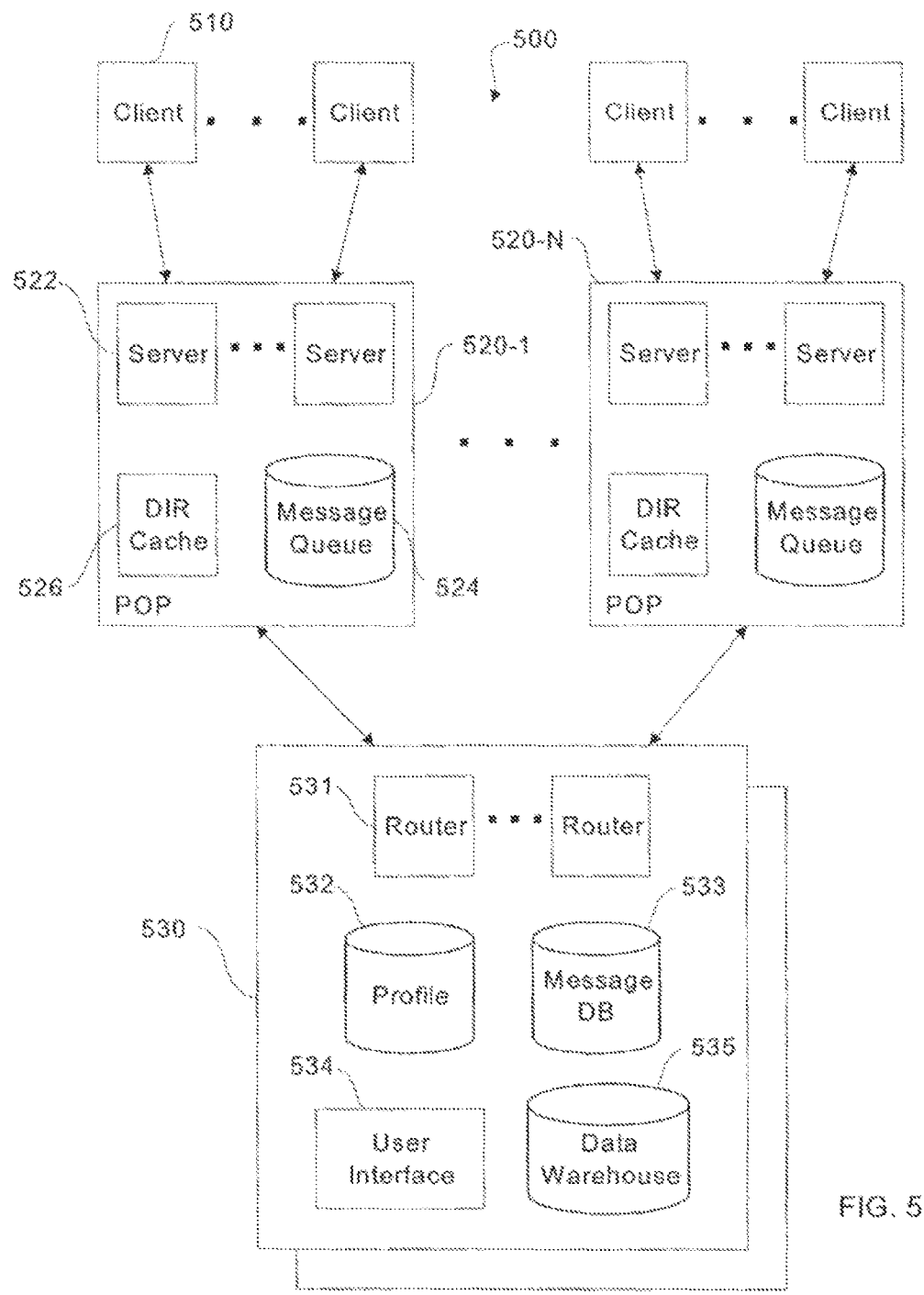
FIG. 5 illustrates an embodiment of a message exchange network.

Having described the flexibility in the operation of message interchange network 150, an embodiment of message interchange network 150 is now provided with reference to FIG. 5. FIG. 5 illustrates a message routing network 500 that includes clients 510, points of presence (POP) 520-*n*, and data center 530.

Clients 510 are generally assigned to a particular POP 520-*n*. POPs 520-*n* include a plurality of servers 522, a message queue 524, and a directory cache 526. Directory cache 526 includes profile information on clients 510. The content of directory cache 526 is based on profile database 532 in data center 530. Message queue 524 is operative to store messages that are posted by clients 510 and to store messages that are awaiting delivery to clients 510. Finally, servers 522 are lightweight servers that process HTTP transactions. Servers 522 are operative to receive messages posted by clients 510, and to send messages to clients 510. As noted, clients 510 can have messages pushed to them or can retrieve messages as part of a polling process.

Routing within message routing network 500 is generally enabled through routers 531 in data center 530. In one embodiment, routers 531 are operative to pull messages from message queues 524 in POPs 520-*n*, perform route calculations, and post messages to message queues 524 that are located in a POP 520-*n* that is assigned to the destination client 510.

Headers of messages that are routed by routers 510 are stored in message database 533. Message database 533 retains updated states of message objects that are routed through message routing network 500.

Also included within data center 530 is profile database 532, data warehouse 535, and web interface component 534. Profile database 532 stores profile information for registered clients 510. The profile information includes routing rules that have been defined for the various clients 510. Data warehouse 535 stores a collection of log information relating to messages that are processed by message routing network 500. Finally, user interface component 534 enables clients 510 to enter profile information into profile database 532, access reports in data warehouse 535, and perform directory lookups to find other connected services.

While the invention has been described in detail and with reference to specific embodiments thereof, it will be apparent to one skilled in die art that various changes and modifications can be made therein without departing from the spirit and scope thereof. Thus, it is intended that the present invention cover the modifications and variations of this invention provided they come within the scope of the appended claims and their equivalents.

APPENDIX A

Example Messages and Message Elements

I. Messages

Posted Request and Notification Messages

```
<Message>
    <Header>
        <To/>
        <From/>
        <Topic/>?
        <Expiration/>?
    </Header>
    <Body>
        <Document/>*
    </Body>
</Message>
```

Posted Response Messages

```
<Message>
    <Header>
        <Token/>
        <From/>
        <Status/>?
    </Header>
    <Body>
        <Document/>*
    </Body>
</Message>
```

Delivered Request and Notification Messages

```
<Message>
    <Header>
        <Session/>
        <Token/>
        <To/>
        <From/>
        <Topic/>?
    </Header>
    <Body>
        <Document/>*
    </Body>
</Message>
```

Delivered Response Messages

```
<Message>
    <Header>
        <Session/>
        <Token/>
        <To/>
        <From/>
        <Topic/>?
        <Status/>?
    </Header>
    <Body>
        <Document/>*
    </Body>
</Message>
```

II. Message Elements
<Message>
Purpose: Root envelope for a message.
Message types: All message types
Attributes: type (required)=request|response|notification test
   (optional)=false (default)|true
Child Elements: Header-{1}, Body-{1}

Note: The test attribute indicates if the message is a test message—that the message should be routed with no persistent effects in any of the participating services. The message type is "request" when a message is delivered to an engine.

<Header>
Purpose: Root element for a message header.
Message types: All message types.
Attributes: None.
Child Elements: Session, Token, To, From, Topic Status, Expiration {Cardinality of elements depends on message type}

<Session>
Purpose: Unique session identifier assigned by message interchange network to the message.
Message types: All delivered message types.
Attributes: id (required)=(globally unique identification string)
Content: None.
Note: The session is effectively a "tracking slip" for messages. In one embodiment, all services in a message's route receive the same session identifier. The scope of a message session depends on the message type. For a request message, the message session includes the response as well—therefore response messages do not receive a new session. For a notification, the message session only applies through to the recipients. In an alternative embodiment, a service can demand a new session for an included service, thereby hiding some services from being tracked by the original sender.

<Token>
Purpose: Unique reference identifier assigned by the message interchange network.
Message types: All delivered message types. Posted response.
Attributes: value (required)=(unique identification string)
Content: None.
Note: A token is used to uniquely identify a delivered message when issuing an acknowledge to polled delivery, and serves as a message reference in posted response messages. When a service posts a response message, the message includes the token from the previously received request message.

<To>
Purpose: Identification of the recipients of the message.
Message types: All message types except posted response.
Attributes: None.
Child Elements: Service-{1:N}
Note: The To element indicates the recipients of a posted request or notification message. In delivered messages, the To element indicates the service invoked and contains the arguments and cookie necessary for the service to process the message. Posted request and notification messages may have multiple recipients, in which case there will be multiple child Service elements. All delivered messages can include only one Service element.

<Service>
Purpose: Identifies a service connected to the message interchange network
Message types: All message types.
Attributes: gcid=(unique service identifier assigned by the message interchange network to the service);
name=(name of organization owning the service)/(service name)
Child Elements: Arguments-{0:1}, Cookie-{0:1}
Note: At least one of the two attributes should appear in order to specify the service. If one of the attributes is omitted, the message interchange network fills in the omitted attribute when composing a header for delivery.

<Arguments>
Purpose: Text or parameters that further specifies what the service is to perform and how.
Message types: All message types.
Attributes: None.
Content: Text string (as xml CDATA block).
Note: The format of the argument string is up to each service to define. The Arguments element need not be parsed or verified by the message interchange network. It is the responsibility of the message composer to insert the necessary contents understandable by the service. Whether or not the text is XML, the contents of the arguments element should be enclosed in a CDATA block.

<Cookie>
Purpose: Service-defined block of text or parameters that a service wants delivered with invocation.
Message types: All message types.
Attributes: None.
Content: Text string (as xml CDATA block).
Note: The cookie element contains a block of text (or xml) previously registered by a service with the message interchange network. The format of the cookie string is up to each service to define. The Cookie element need not be parsed or verified by the message interchange network. Whether or not the text is XML, the contents of the Cookie element will be enclosed in a CDATA block.

<From>
Purpose: Identification of the sending (or invoking) service of the message.
Message types: All message types.
Attributes: None.
Child Elements: Service-{1}
Note: The From element indicates the sender of the message to the receiving services. In the delivery header, the service in the From element is the "logical" sender representing the service that include the receiving service into the message route. Thus, each receiving service perceives the received message as an invocation from the including service rather than a message coming from the originating sender service.

<Topic>
Purpose: Indicate the topic of the message.
Message types: All message types except posted response.
Attributes: None.
Content: Dot-separated topic category.
Note: Topic provides a categorization of the message. The categorization should be hierarchical, but the message interchange network need not have a predefined set of topics. The Topic element is useful for services that push out events, where the topic can be the name of the event for which recipients are being notified.

<Status>
Purpose: Indicates the status of processing a request.
Message types: Response.
Attributes: None.
Content: Dot-separated status code.
Note: The status element provides a means for the respondent of a request message to indicate the success (or lack thereof) of processing the request message. Absence of the status element in a response message indicates unqualified success of the response. In the case of a qualified success (e.g., a warning, a fault, a failure, or other status, a service should include the status element and provide an appropriate status code indicating the problem.

<Expiration>
Purpose: Specifies a time by which a message must complete its routing.
Message types: Posted request and notification.
Attributes: units (optional)=msec (default)|sec|hr
Content: numeric value.
Note: The expiration specifies when the message must reach its final destination. For request messages, the expiration includes the return of the response message. For notification messages, the expiration only applies up to delivery to the recipients. Expiration time is measured against the time the message is first posted to the message interchange network.
<Body>
Purpose: The root element for the actual message data.
Message types: all message types.
Attributes: None.
Child elements: Document-{0:N}
<Document>
Purpose: A self-contained unit of message data.
Message types: All message types.
Attributes: id (optional)=(fragment name for document element);
 content-type (required)=(MIME type);
 schema (optional)=(URI to schema used for document; no default);
 xmlns (optional)=(URI to namespace used in document; no default);
 encoding (optional)=none (default)|base64
Content: The document data—XML, binary, free text, or any other format.

APPENDIX B.1

| Message as posted by MyBiz.com |
| --- |
| ```
<Message>xmlns="http://namespaces.grandcentral.com/messages/env-v01" >type="request" >test="false">
    <Header>
        <To>
            <Service >name="TheAcmeCompany/supply">
                <Arguments>
                    <! [CDATA[action=ProcessPurchaseOrder]]>
                </Arguments>
            </Service>
            <Service >name="BigBrother/GlobalListener"/>
        </To>
        <From>
            <Service>gcid="386b4520f489c217"/>
        </From>
        <Expiration >units="hr">20</Expiration>
    </Header>
    <Body>
        <Document>id="doc-1">contenttype="text/xml"
         >encoding="none">
            <PurchaseOrder>xmlns="urn:MyBiz:ns-1">
                <Id>89987</Id>
                <Item>type="SKU">3456-76987-34</Item>
                <Quantity>2</Quantity>
                <CustomerNumber>3489</CustomerNumber>
                <Address>31>Ocean>Front>WaySomeCity, >AK,
                 >10984</Address>
            </PurchaseOrder>
        </Document>
    </Body>
</Message>
``` |

APPENDIX B.2

| Message as Delivered to XpandiCo |
| --- |
| ```
<Message>xmlns="http://namespaces.grandcentral.com/messages/env-v01" >type="request">
``` |

APPENDIX B.2-continued

| Message as Delivered to XpandiCo |
| --- |
| ```
    <Header>
        <Session>id="34b9f6d0-89eb-b5e1-0022-a376bf41c165"/>
        <Token>value="84e309b38c56a18cb9835203"/>
        <To>
            <Service>gcid="3340f32c035d7499">name=
             "xandico/zipPlus4">
                <Arguments>
                    <! [CDATA[element=PurchaseOrder/Address/Zip]]>
                </Arguments>
            </Service>
        </To>
        <From>
            <Service>gcid="386b4520f489c217">name="mybiz.com/">
        </From>
    </Header>
    <Body>
        <Document>id="docA">content-type="text/xml">encoding=
         "none">
            <PurchaseOrder>xmlns="http://www.estandards.org/
             PurchaseOrderRequest">
                <POId>89987</POId>
                <Item>type="SKU">3456-76987-34</Item>
                <Quantity>2</Quantity>
                <CustomerID>3489</CustomerID>
                <Address>
                    <Street>31>Ocean>Front>Way</Street>
                    <City>SomeCity, >AK</City>
                    <Zip>10984</Zip>
                </Address>
            </PurchaseOrder>
        </Document>
    </Body>
</Message>
``` |

APPENDIX B.3

| Response Message as Returned from XpandiCo |
| --- |
| ```
<Message>xmlns="http://namespaces.grandcentral.com/messages/env-v01" >type="response">
    <Header>
        <Token>value="84e309b38c56a18cb9835203"/>
        <From>
            <Service>name="xpandico/zipPlus4"/>
        </From>
    </Header>
    <Body>
        <Document >id="xfm-doc">content-type="text/xml">encoding=
         "none">
            <PurchaseOrder >xmlns="http://www.estandards.org/
             PurchaseOrderRequest">
                <POId>89987</POId>
                <Item>type="SKU">3456-76987-34</Item>
                <Quantity>2</Quantity>
                <CustomerID>3489</CustomerID>
                <Address>
                    <Street>31>Ocean>Front>Way</Street>
                    <City>SomeCity, >AK</City>
                    <Zip>10984-0673</Zip>
                </Address>
            </PurchaseOrder>
        </Document>
    </Body>
</Message>
``` |

APPENDIX B.4

| Message as Delivered to The Acme Company |
| --- |
| ```
<Message>xmlns="http://namespaces.grandcentral.com/messages/env-v01" >type="request">
    <Header>
``` |

APPENDIX B.4-continued

Message as Delivered to The Acme Company

```
<Session>id="34b9f6d0-89eb-b5e1-0022-a376bf41c165"/>
<Token>value="30c481b28ad6e87b09f62182"/>
<To>
    <Service>gcid="789e3223d9017f45">name=
    "TheAcmeCompany/Supply">
        <Arguments>
            <![CDATA[action=ProcessPurchaseOrde]]>
        </Arguments>
    </Service>
</To>
<From>
    <Service>gcid="386b4520f489c217"/>name="mybiz.com">
</From>
</Header>
<Body>
    <Document>id="doc-3">contenttype="text/xml">encoding=
    "none">
        <PurchaseOrder>xmlns="http://www.estandards.org/
        PurchaseOrderRequest">
            <POId>89987</POId>
            <Item>type="SKU">3456-76987-34</Item>
            <Quantity>2</Quantity>
            <CustomerID>BX0045012</CustomerID>
            <Address>
                <Street>31>Ocean>Front>Way</Street>
                <City>SomeCity, >AK</City>
                <Zip>10984-0673</Zip>
            </Address>
        </PurchaseOrder>
    </Document>
</Body>
</Message>
```

APPENDIX B.5

Response Message to MyBiz.com as Posted by The Acme Company

```
<Message>xmlns="http://namespaces.grandcentral.com/messages/env-
v01" >type="response">
    <Header>
        <Token>value="30c481b28ad6e87b09f62182"/>
        <From>
            <Service>name="TheAcmeCompany/Supply"/>
        </From>
    </Header>
    <Body>
        <Document>id="resp_doc">content-
        type="text/xml">encoding="base64">
        zs134rkuwkloirlmnm5loli2smn7fslk7ui88u98wq7rsdolikjhdfloi9rkjjf
        </Document>
    </Body>
</Message>
```

The invention claimed is:

1. A method, comprising:
receiving a message at a message interchange network from a sending service, wherein the message is constructed in a format by a first process executing in the sending service;
storing the message by the message interchange network;
distributing the message to a second process executing in a receiving service;
wherein the second process periodically polls the message interchange network for messages routed to the message interchange network, such that the message is distributed in response to the second process polling the message interchange network to retrieve the message from the message interchange network and in response to the receiving service being authenticated by the message interchange network using information for the receiving service that is stored by the message interchange network;
wherein a lifetime of the message interchange network is controlled by:
determining that a specified expiration time has passed before the retrieving of the message from the message interchange network by the second process, and
in response to determining that the specified expiration time has passed before the retrieving of the message from the message interchange network by the second process, aborting further routing of the message;
wherein the first process executing in the sending service enables the sending service to use an interface supported by the message interchange network for sending the message, and the second process executing in the receiving service enables the receiving service to use the interface supported by the message interchange network for retrieving the stored message.

2. The method of claim 1, wherein the message contains a header.

3. The method of claim 2, wherein the header conforms to a XML schema.

4. The method of claim 2, wherein header information in the header affects routing of the message.

5. The method of claim 1 further comprising receiving an authentication token provided by the message interchange network.

6. The method of claim 1, wherein the executing the second process uses a secure HTTPS protocol.

7. The method of claim 1, wherein the message is retrieved from the message interchange network in response to the message being posted at the message interchange network, and wherein the message is posted at the message interchange network in response to an authentication of the sending service by the message interchange network using information for the sending service that is stored by the message interchange network.

8. The method of claim 1, wherein the information for the receiving service that is used by the message interchange network to authenticate the receiving service includes a receiving token issued for the receiving service by the message interchange network.

9. The method of claim 1, wherein the sending service and the receiving service are each an application of a different organization, wherein each application of each organization is a different service connected to the message interchange network.

10. The method of claim 1, wherein the sending service and the receiving service each register with the message interchange network.

11. The method of claim 1, wherein the message interchange network includes a policy.

12. The method of claim 1, wherein the message interchange network handles the message based on a type of the message.

13. The method of claim 1, wherein the message interchange network determines whether the message is a duplicate of a previous message routed to the message interchange network.

14. A system, comprising:
a hardware processor for:
receiving a message at a message interchange network from a sending service, wherein
the message is constructed in a format by a first process executing in the sending service;
storing the message by the message interchange network;
distributing the message to a second process executing in a receiving service;

wherein the system is operable such that the second process periodically polls the message interchange network for messages routed to the message interchange network, such that the message is distributed in response to the second process polling the message interchange network to retrieve the message from the message interchange network and in response to the receiving service being authenticated by the message interchange network using information for the receiving service that is stored by the message interchange network;

wherein the system is operable such that a lifetime of the message interchange network is controlled by:
   determining that a specified expiration time has passed before the retrieving of the message from the message interchange network by the second process, and
   in response to determining that the specified expiration time has passed before the retrieving of the message from the message interchange network by the second process, aborting further routing of the message;

wherein the system is operable such that the first process executing in the sending service enables the sending service to use an interface supported by the message interchange network for sending the message, and the second process executing in the receiving service enables the receiving service to use the interface supported by the message interchange network for retrieving the stored message.

15. The system of claim 14, wherein the system is operable such that the message contains a header.

16. The system of claim 15, wherein the system is operable such that the header conforms to a XML schema.

17. The system of claim 15, wherein the system is operable such that header information in the header affects routing of the message.

18. The system of claim 14 further comprising logic for receiving an authentication token provided by the message interchange network.

19. The system of claim 14, wherein the system is operable such that the executing the second process uses a secure HTTPS protocol.

20. A computer program product embodied on a non-transitory computer readable medium, comprising:
   computer code for receiving a message at a message interchange network from a sending service, wherein the message is constructed in a format by a first process executing in the sending service;
   computer code for storing the message by the message interchange network;
   computer code for distributing the message to a second process executing in a receiving service;
   wherein the computer program product is operable such that the second process periodically polls the message interchange network for messages routed to the message interchange network, such that the message is distributed in response to the second process polling the message interchange network to retrieve the message from the message interchange network and in response to the receiving service being authenticated by the message interchange network using information for the receiving service that is stored by the message interchange network;
   wherein the computer program product is operable such that a lifetime of the message interchange network is controlled by:
      determining that a specified expiration time has passed before the retrieving of the message from the message interchange network by the second process, and
      in response to determining that the specified expiration time has passed before the retrieving of the message from the message interchange network by the second process, aborting further routing of the message;
   wherein the computer program product is operable such that the first process executing in the sending service enables the sending service to use an interface supported by the message interchange network for sending the message, and the second process executing in the receiving service enables the receiving service to use the interface supported by the message interchange network for retrieving the stored message.

21. The computer program product of claim 20, wherein the computer program product is operable such that the message contains a header.

22. The computer program product of claim 21, wherein the computer program product is operable such that the header conforms to a XML schema.

23. The computer program product of claim 21, wherein the computer program product is operable such that header information in the header affects routing of the message.

24. The computer program product of claim 20 further comprising computer code for receiving an authentication token provided by the message interchange network.

25. The computer program product of claim 20, wherein the computer program product is operable such that the executing the second process uses a secure HTTPS protocol.

26. The method of claim 7, wherein the information for the sending service that is used by the message interchange network to authenticate the sending service includes a sending token issued for the sending service by the message interchange network.

27. The method of claim 26, wherein the sending token is issued by the message interchange network in response to authentication of a username and password for the sending service.

28. The method of claim 7, wherein the information for the sending service that is used for the authentication of the sending service by the message interchange network includes authentication information.

29. The method of claim 28, wherein the authentication information is generated in response to registration of the sending service with the message interchange network.

30. The method of claim 8, wherein the receiving token is issued by the message interchange network in response to authentication of a username and password for the receiving service.

31. The method of claim 11, wherein the policy is specified by the receiving service.

* * * * *